AMPLIFIER CIRCUIT WITH UNIPOLAR OUTPUT
INDEPENDENT OF INPUT POLARITY
Filed July 24, 1963
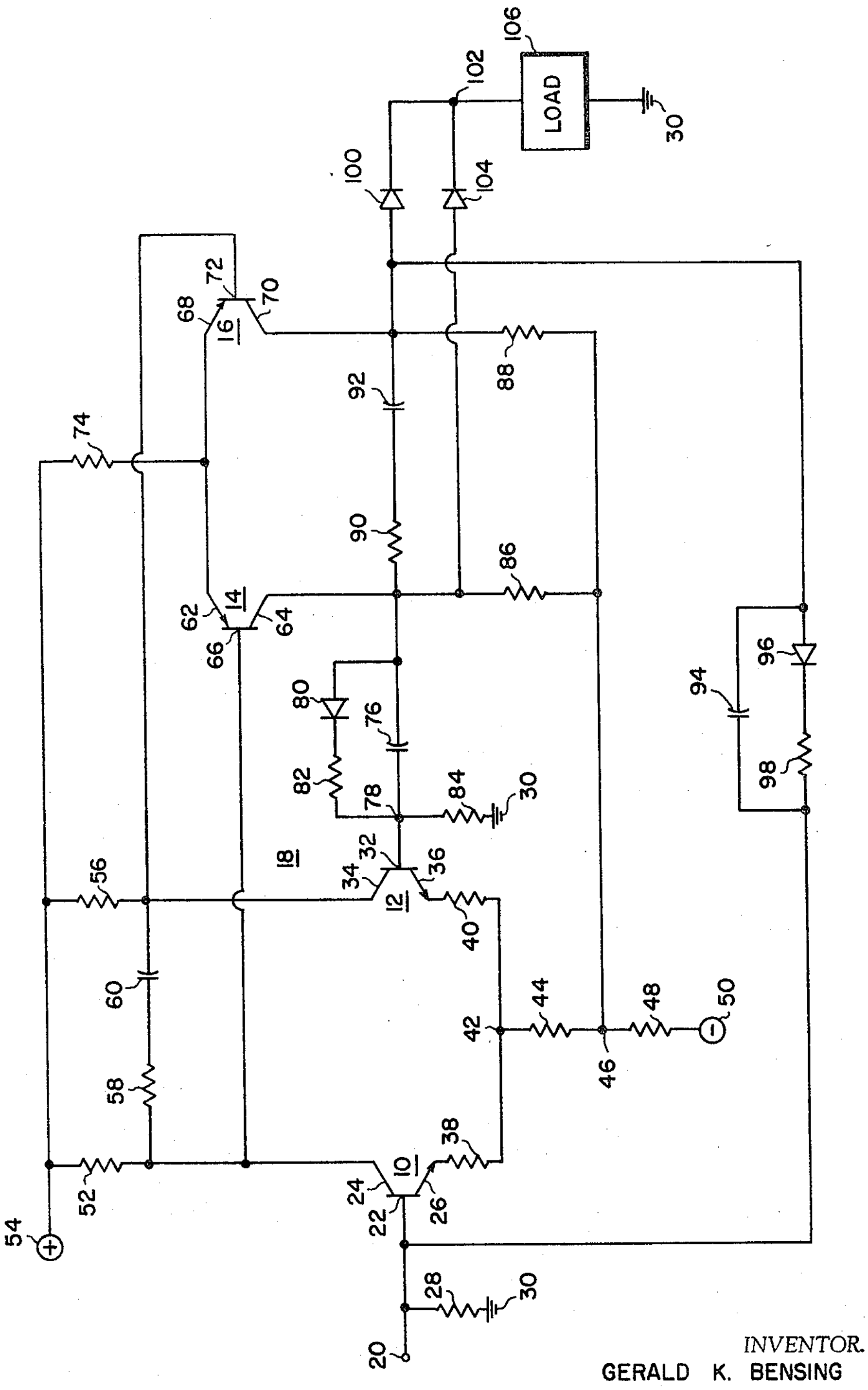
INVENTOR.
GERALD K. BENSING
BY Roger W. Jensen
ATTORNEY

1

3,292,098

AMPLIFIER CIRCUIT WITH UNIPOLAR OUTPUT INDEPENDENT OF INPUT POLARITY

Gerald K. Bensing, Minneapolis, Minn., assignor to Honeywell Inc., a corporation of Delaware Filed July 24, 1963, Ser. No. 297,448
2 Claims. (Cl. 330—69)

This invention pertains to amplifiers in general and more specifically to a feedback network for a so-called "absolute amplifier."

As used in this specification, the terms "absolute amplifier" or absolute apparatus refer to apparatus or an amplifier which will provide a unipolarity output signal regardless of whether the input signal is of one polarity or the other. In essence the circuit performs the same function as would a full wave rectifier but it is advantageous over a full wave rectifier in that no transformers are required and there is no dead zone around a "null" output as would be found in a full wave rectifier bridge. A further shortcoming of a full wave rectifier as absolute apparatus is that the grounds of the input and output circuits must be completely isolated to prevent destruction of the diodes. This isolation, which is not required in the present invention, is not always obtainable or desirable. In order to accomplish this unipolarity output function, a differential amplifier is used and diodes are utilized to rectify the output signal and thereby provide a unipolarity signal at the output of the apparatus. These diodes produce a voltage drop between the output of the amplifier itself and the output of the apparatus. If the feedback network is taken from the output of the apparatus to the input of the amplifier, there will be a positive feedback with one polarity input and negative feedback with the other polarity input. Since positive feedback will normally cause oscillations, this arrangement is undesirable. If the feedback is taken from the amplifier output before the voltage drop occurs, there will be an error in the output signal equivalent to the voltage drop of the diodes whenever there is no input signal to the amplifier. This error remains with increasing amplitude output signals but becomes proportionately less important. To overcome this voltage drop error, diodes have been placed in the feedback network so that the voltage on one side of the feedback impedance is the same as that appearing at the output portion of the absolute amplifier apparatus. If the diodes in the feedback network are identical to the diodes in the output, the feedback signal will be such that the amplifier output will then be an amount above the reference potential which is equivalent to the voltage drop of the output diodes when there is no input signal present to the amplifier. Thus the output voltage will be minimal with no input signal applied to the amplifier.

It is an object of this invention to provide absolute apparatus which will minimize the output error signal and also minimize the dead zone or area around which no output signal is obtained in apparatus which performs this function.

Further objects and advantages of this invention will appear from a reading of the specification and appended claims along with the single figure which is a schematic representation of one embodiment of a working circuit utilizing this invention.

In the drawing, two NPN transistors 10 and 12 together with two PNP transistors 14 and 16 form a composite differential amplifier generally designated as 18. This amplifier 18 has an input terminal 20 which is the same as the absolute apparatus input and is connected to a base 22 of transistor 10 which also has a collector 24 and an emitter 26. An impedance means or resistance means 28

2 is connected between input 20 and ground or reference potential 30. The transistor 12 has a base 32, a collector 34 and an emitter 36. Two resistors or impedance means 38 and 40 are connected in series between emitter 26 of transistor 10 and emitter 36 of transistor 12 respectively. A junction point 42 between the resistors 38 and 40 is connected to one end of a resistor or impedance means 44 which has its other end connected to a junction point 46. A resistor or impedance means 48 is connected between the junction point 46 and a negative power terminal means 50. A resistor or impedance means 52 is connected between the collector 24 of transistor 10 and a positive power terminal means 54. A resistor or impedance means 56 is connected between power terminal means 54 and collector 34 of transistor 12. A resistor or impedance means 58 is connected in series with a capacitive means 60 between collector 24 and collector 34. The transistor 14 has an emitter 62 and a collector 64 and further has a base 66 which is connected to the collector 24 of transistor 10. The transistor 16 has an emitter 68 and a collector 70 and further has a base 72 which is connected to the collector 34 of transistor 12. An impedance means or resistor 74 is connected between the positive power terminal means 54 and the emitters 62 and 68 of transistors 14 and 16, respectively. A capacitor 76 is connected between the collector 64 of transistor 14 and a junction point 78 which is further connected to base 32 of transistor 12. A diode means, rectifying means or nonlinear resistance means 80 is connected in series with an impedance means or resistor 82 and the combination is connected in parallel with capacitor 76 between collector 64 and junction point 78. The diode 80 is connected such that the direction of easy current flow is from collector 64 to junction point 78. A resistor or impedance means 84 is connected between junction point 78 and ground or reference potential 30. A further resistance or impedance means 86 is connected between collector 64 and junction point 46. A resistor or impedance means 88 is connected between collector 70 of transistor 16 and the junction point 46. A resistor or impedance means 90 is connected in series with a capacitor 92 between collector 64 and collector 70. The capacitor resistor combinations 60 and 58 and 90 and 92 are for the purpose of characterizing the high frequency response curve and are not a necessary part of the invention in all applications. A capacitor 94 is connected between collector 70 and input 20. A diode means, non-linear resistance means or rectifying means 96 is connected in series with a resistance or impedance means 98 and the combination is connected in parallel wtih capacitor 94. The amplifier 18 has its output between collectors 64 and 70. A diode means, rectifying means or nonlinear resistance means 100 is connected between the collector 70 of transistor 16 and an output terminal 102 which is the output of the absolute apparatus of this drawing. A diode means, nonlinear resistance means or rectifying means 104 is connected between collector 64 and the output terminal 102.

In operation an input signal is applied to terminal 20. If the signal is positive with respect to ground, transistor 10 conducts to a greater extent. Since transistors 10 and 12 are connected in a differential configuration, the current flow in transistor 12 will decrease. The lowering of the voltage at collector 24 of transistor 10 toward ground lowers the voltage at base 66 of transistor 14 and permits this transistor to conduct more. This action raises the voltage at collector 64 of transistor 14 and allows an output signal through diode 104 to the output 102 of the absolute apparatus. At this same time the transistor 12 is conducting less and therefore the collector 34 rises in voltage. This rise in voltage at collector 34 causes transistor 16 to conduct less and lowers the voltage at collector 70. In the initial condition of no input signal the collectors 64 and 70 are at near ground potential. Since the collector 70 is now going in a negative direction there will be no current through diode 100 as it is necessarily back-biased. Therefore the only output signal with a positive polarity input signal is from collector 64 through diode 104 to output 102 and from there through load 106 to ground 30. Since collector 70 is negative with respect to ground, the diode 96 is also back-biased and there is no feedback from there back to the input 20 of the amplifier 18. However, the diode 80 is forward biased and current will flow through this diode and feedback resistor 82 to the base 32 of transistor 12. With a positive input signal at terminal 20, transistor 12 attempts to conduct less. Since the feedback signal is a rising or positive voltage, this signal counteracts the effect of the input signal and attempts to make transistor 12 conduct more. Thus negative feedback is applied to counteract the input signal and thereby stabilize the gain of amplifier 18 at a value less than would be obtained if there was no feedback in the circuit. The capacitors 76 and 94 permit high frequency feedback but are of negligible conductance for low frequency signals.

On close observation, it may be noted that if through temperature effects both transistors 14 and 16 conduct to a greater extent, the collectors 64 and 70 respectively will rise in voltage. This rise in voltage will be applied to transistors 10 and 12 through the resistors 82 and 98. This rise in voltage at the collectors of transistors 14 and 16 will attempt to make transistors 10 and 12 conduct more and provide a positive feedback effect. However, this positive feedback effect is partly cancelled out by the negative feedback due to the fact that resistor 48 is common to both differential amplifiers. This resistor 48 acts in the same manner as does the resistor 44 and resistor 74 for the individual differential amplifiers. By this it is meant that more conduction through the differential amplifier utilizing transistors 14 and 16 will result in a rise in voltage at junction point 46. This rise in voltage also raises the voltage at junction point 42 and thereby lowers the potential difference between the emitters of these transistors 10 and 12 and their bases. This counters the positive feedback effect enough so that very little change is noted in this circuit throughout its operating temperature range.

It will be realized by those skilled in the art that the invention is not limited to two stages of differential amplification but may have more or less transistors or amplifying means and that the invention does not consist in the number of stages but in the fact that the diodes such as 80 and 96 are placed in the feedback network to provide the same voltage drop before the feedback signal is applied to the feedback resistors as is obtained through the diodes such as 100 and 104 which are placed between the amplifier output and the output of the absolute apparatus, to minimize any errors in the output signal. It will be further realized that the use of matched diodes will provide greater accuracy than merely placing a diode in the feedback network. It will be realized also that the current in the feedback network are not necessarily the same as that in the output and that therefore the voltage drop even with matched diodes will not be exactly the same. However, for most purposes the difference in voltage drop between the output circuit and the feedback circuit is not enough to make any appreciable difference in the accuracy of the device.

While the terms transistors or NPN or PNP transistors were used in describing this device, it is to be realized that vacuum tubes or other terms such as valves, amplifying means or current or voltage sensitive means are also to be used in describing these amplifying elements. Also opposite conductivity transistors may be used by switching the power terminal polarities at points 50 and 54. Capacitors and capacitance means have been used indiscriminately in this specification and the two terms are to be considered synonymous. While the primary use of this device is where an absolute amplifier is desired or where a full wave rectifying circuit is desired without the use of inductances or transformers, it is to be realized that the invention is not limited to these but is only limited by the contents of the appended claims.

I claim:

1. Absolute apparatus for converting a multi-polarity input signal of variable magnitude to a unipolarity output signal which has a magnitude that is a function of the input signal, the apparatus including input and output means and further comprising, in combination:

first differential amplifier means including first and second input means and first and second output means;

second differential amplifier means including first and second input means and first and second output means;

means connecting the input means of the absolute apparatus to said first input means of said first differential amplifier means;

reference potential means connected to said second input means of said first differential amplifier means;

means connecting said first output means of said first differential amplifier means to said first input means of said second differential amplifier means;

means connecting said second output means of said first differential amplifier means to said second input means of said second differential amplifier means;

first rectifying means connecting said first output means of said second differential amplifier means to the output means of the absolute apparatus;

second rectifying means connecting said second output means of said second differential amplifier means to the output means of the absolute apparatus;

first feedback means connecting said first output means of said second differential amplifier means to said second input means of said first differential amplifier means, said first feedback means including a third rectifying means such that feedback is obtained only when said first output means of said second differential amplifier means is of a predetermined polarity with respect to said second input means of said first differential amplifier means, the third rectifying means providing a voltage drop in the feedback signal substantially equal to that provided by said first rectifying means and thereby minimizing errors in the output signal; and second feedback means connecting said second output means of said second differential amplifier means to said first input means of said first differential amplifier means, said second feedback means including a fourth rectifying means such that feedback is obtained only when said second output means of said second differential amplifier means is of a predetermined polarity with respect to said first input means of said first differential amplifier means, the fourth rectifying means providing a voltage drop in the feedback signal substantially equal to that provided by said second rectifying means and thereby minimizing errors in the output signal.

2. Absolute apparatus for converting an input signal of variable magnitude to a unipolarity output signal which as a magnitude that is a function of the input signal, the apparatus including input and output means and further comprising, in combination:

differential amplifier means including first and second input means and first and second output means;

means connecting the input means of the absolute apparatus to said first input means of said differential amplifier means;

reference potential means connected to said second input means of said differential amplifier means;

first rectifying means connecting said first output means of said differential amplifier means to the output means of the absolute apparatus;

second rectifying means connecting said second output means of said differential amplifier means to the output means of the absolute apparatus;

first feedback means connecting said first output means of said differential amplifier means to said second input means of said differential amplifier means, said first feedback means including a third rectifying means for allowing feedback only when said first output means of said differential amplifier means is of a predetermined polarity with respect to said second input means of said differential amplifier means, the third rectifying means providing a voltage drop in the feedback signal substantially equal to that provided by said first rectifying means and thereby minimizing errors in the output signal; and second feedback means connecting said second output means of said differential amplifier means to said first input means of said differential amplifier means, said second feedback means including a fourth rectifying means for allowing feedback only when said second output means of said differential amplifier means is of a predetermined polarity with respect to said first input means of said differential amplifier means, the fourth rectifying means providing a voltage drop in the feedback signal substantially equal to that provided by said second rectifying means and thereby minimizing errors in the output signal.

References Cited by the Examiner

UNITED STATES PATENTS

| | | | |
|---|---|---|---|
| 3,109,989 | 11/1963 | Muir | 330—140 X |
| 3,112,449 | 11/1963 | Miller | 328—26 |
| 3,222,609 | 12/1965 | Ulmer et al. | 330—140 X |

ROY LAKE, *Primary Examiner.*

N. KAUFMAN, *Assistant Examiner.*